(12) United States Patent
Koo et al.

(10) Patent No.: US 12,334,260 B2
(45) Date of Patent: Jun. 17, 2025

(54) CONDUCTIVE PASTE AND MULTILAYER ELECTRONIC COMPONENT

(71) Applicant: SAMSUNG ELECTRO-MECHANICS CO., LTD., Suwon-si (KR)

(72) Inventors: Kun Ho Koo, Suwon-si (KR); San Kyeong, Suwon-si (KR); Soung Jin Kim, Suwon-si (KR); Young Soo Yi, Suwon-si (KR); Ho Yeol Lee, Suwon-si (KR); Ic Seob Kim, Suwon-si (KR); Kyung Ryul Lee, Suwon-si (KR); Chang Hak Choi, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 237 days.

(21) Appl. No.: 18/072,913

(22) Filed: Dec. 1, 2022

(65) Prior Publication Data
US 2023/0343514 A1    Oct. 26, 2023

(30) Foreign Application Priority Data
Apr. 22, 2022    (KR) .................. 10-2022-0049804

(51) Int. Cl.
| | |
|---|---|
| H01G 4/008 | (2006.01) |
| C03C 8/04 | (2006.01) |
| H01G 4/012 | (2006.01) |
| H01G 4/224 | (2006.01) |
| H01G 4/232 | (2006.01) |
| H01G 4/30 | (2006.01) |

(52) U.S. Cl.
CPC ............ *H01G 4/008* (2013.01); *C03C 8/04* (2013.01); *H01G 4/012* (2013.01); *H01G 4/224* (2013.01); *H01G 4/232* (2013.01); *H01G 4/30* (2013.01)

(58) Field of Classification Search
CPC ........ H01G 4/008; H01G 4/012; H01G 4/224; H01G 4/232; H01G 4/30; H01G 4/32; C03C 8/04
See application file for complete search history.

(56) References Cited

U.S. PATENT DOCUMENTS

| | | | | |
|---|---|---|---|---|
| 2004/0144962 | A1* | 7/2004 | Hayakawa ........... | H01G 4/2325 252/500 |
| 2008/0063877 | A1 | 3/2008 | Ukuma | |
| 2012/0295122 | A1* | 11/2012 | Park ........................ | C03C 3/089 428/471 |
| 2013/0250480 | A1* | 9/2013 | Ahn ........................ | H01G 4/129 156/89.12 |
| 2014/0008587 | A1* | 1/2014 | Yoshida ................... | C09D 5/24 252/513 |

(Continued)

FOREIGN PATENT DOCUMENTS

| | | |
|---|---|---|
| KR | 10-2006-0096014 A | 9/2006 |
| KR | 10-2012-0129441 A | 11/2012 |

*Primary Examiner* — Michael P McFadden
(74) *Attorney, Agent, or Firm* — Morgan, Lewis & Bockius LLP

(57) ABSTRACT

A conductive paste includes: conductive powder containing Cu particles; and a glass frit including an oxide containing alkali metal, wherein a content of the alkali metal is 0.16 wt % or more and 0.35 wt % or less with respect to a total content of the Cu particles.

19 Claims, 13 Drawing Sheets

(56) References Cited

U.S. PATENT DOCUMENTS

| | | | |
|---|---|---|---|
| 2014/0239238 A1* | 8/2014 | Tsunoda | C03C 8/14 |
| | | | 252/514 |
| 2014/0376155 A1* | 12/2014 | Omori | H01G 4/30 |
| | | | 361/301.4 |
| 2015/0062774 A1* | 3/2015 | Yoon | H01G 4/30 |
| | | | 361/301.4 |
| 2022/0234943 A1* | 7/2022 | Axtell, III | C03C 8/14 |

* cited by examiner

CONDUCTIVE PASTE AND MULTILAYER ELECTRONIC COMPONENT

CROSS-REFERENCE TO RELATED APPLICATION(S)

The present application claims the benefit of priority to Korean Patent Application No. 10-2022-0049804 filed on Apr. 22, 2022 in the Korean Intellectual Property Office, the disclosure of which is incorporated herein by reference in its entirety.

TECHNICAL FIELD

The present disclosure relates to a conductive paste and a multilayer electrode component.

A multilayer ceramic capacitor (MLCC), a multilayer electronic component, may be a chip-type condenser mounted on the printed circuit boards of any of various electronic products, such as an imaging device, including a liquid crystal display (LCD) or a plasma display panel (PDP), a computer, a smartphone, or a mobile phone, serving to charge or discharge electricity therein or therefrom.

The multilayer ceramic capacitor has a small size, implements high capacitance, and is easily mounted on a circuit board, and may thus be used as a component of various electronic devices. There has been increasing demand for the multilayer ceramic capacitor to have a smaller size and higher capacitance as various types of electronic devices such as a computer and a mobile device have a smaller size and higher output.

In addition, in recent years, as industry interest in electronic products has increased, multilayer ceramic capacitors have been required to have high reliability characteristics to be used in automobiles and infotainment systems.

When a sintered electrode is thinned in order to miniaturize the multilayer electronic component, more glass components are required to fill a gap between glass conductive metal particles, in order to improve density of external electrodes.

However, if an amount of the glass component in the sintered electrode is excessively increased, gaps between the conductive metal particles may increase, so that corrosion resistance to a plating solution and moisture-resistance reliability against external moisture permeation defects may occur.

In order to solve this problem, there has been an attempt to secure acid resistance by using glass containing a barium (Ba)-zinc (Zn)-boron (B)-based oxide in the prior art. However, in the case of such acid-resistant glass, wettability with copper (Cu) metal is low, so that agglomeration of the glass may occur.

Due to the agglomeration of the glass, a large number of pores may be generated in the sintered electrode, so that the density thereof may be lowered. On the contrary, corrosion resistance to the plating solution and moisture resistance reliability against external moisture permeation defects may reoccur.

Accordingly, there is a need for a composition of glass and a configuration of a multilayer electronic component capable of improving acid resistance and moisture resistance reliability by improving the density of the sintered electrode while minimizing an increase in the glass content.

SUMMARY

One of several objects of the present disclosure is to solve a problem in which density of a sintered electrode is rather decreased when acid resistant glass is excessively included in the sintered electrode.

One of several objects of the present disclosure is to improve the density of the sintered electrode without increasing a content of glass.

One of several objects of the present disclosure is to solve a problem in which reliability of a multilayer electronic component is deteriorated due to glass erosion when a plating layer is formed on a sintered electrode including glass.

However, the object of the present disclosure is not limited to the above, and will be more easily understood in a process of describing specific embodiments of the present disclosure.

According to an aspect of the present disclosure, a conductive paste includes: a conductive powder containing Cu particles; and a glass frit including an oxide containing an alkali metal, wherein a content of the alkali metal is 0.16 wt % or more and 0.35 wt % or less with respect to a total content of the Cu particles.

According to an aspect of the present disclosure, a multilayer electronic component, includes: a body including a plurality of dielectric layers and first and second internal electrodes alternately disposed with the dielectric layers in a first direction; a first electrode layer disposed on an external surface of the body and connected to the first internal electrode; and a second electrode layer disposed on an external surface of the body and connected to the second internal electrode, wherein the first and second electrode layers include a metal and glass, the metal includes Cu, the glass includes an oxide containing an alkali metal, and a content of the alkali metal is 0.069 wt % or more and 0.149 wt % or less with respect to a total the content of Cu.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
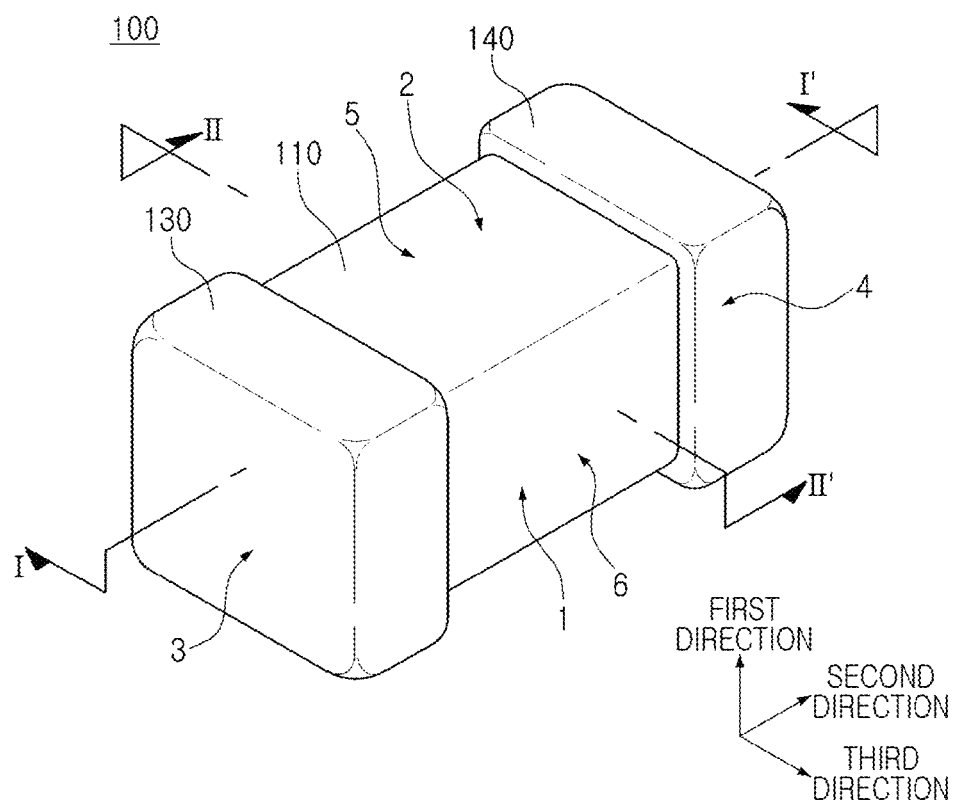
FIG. 1 is a perspective view schematically illustrating a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of elements in the drawings may be exaggerated for clear description, and elements indicated by the same reference numeral are the same elements in the drawings.

In the drawings, certain elements may be omitted to clearly illustrate the present disclosure, and to clearly express a plurality of layers and areas, thicknesses may be magnified. The same elements having the same function within the scope of the same concept will be described using the same reference numeral. Further, throughout the specification, it will be understood that when a portion "includes" an element, it can further include another element, not excluding another element, unless otherwise indicated.

In the drawings, a first direction may refer to a stacking direction or a thickness (T) direction, a second direction may refer to a length (L) direction, and a third direction may refer to a width (W) direction.

Conductive Paste

A multilayer electronic component according to an embodiment of the present disclosure includes, conductive powder including Cu particles; and a glass frit including an oxide containing alkali metal, wherein a content of the alkali metal is 0.16 wt % or more and 0.35 wt % or less with respect to a total content of the Cu particles.

The conductive powder according to an embodiment of the present disclosure may include the Cu particles to ensure contact, electrical connectivity and sinterability with an internal electrode after sintering, and may include, but not limited thereto, at least one selected from the group consisting of copper (Cu), nickel (Ni), silver (Ag), and silver-palladium (Ag—Pd).

The conductive metal particles included in the conductive powder may serve to secure electrical connectivity with the internal electrode when a conductive paste is used as a terminal electrode of a multilayer electronic component such as a multilayer ceramic capacitor.

Specifically, when the conductive paste is sintered, a necking phenomenon occurs between the conductive metal particles and the conductive metal particles may be interconnected to secure electrical conductivity. Meanwhile, when the particles are located to be close enough to each other to cause hopping conduction even between particles in which necking has not occurred, electrical conduction may be secured.

The conductive metal may be a mixture of a spherical metal particle and a flake-type metal particle, thereby improving density and electrical connectivity after sintering.

An average particle diameter of the conductive metal particles of the conductive powder is not particularly limited, but in the case of spherical particles to improve dispersibility when mixed with a glass component, an organic binder and an organic solvent, an average particle diameter thereof may be 0.5 to 5.0 μm, and in the case of flake-type particles, an average major diameter thereof may be 100 nm to 6 μm.

The conductive paste may include a glass frit to fill empty spaces between the conductive powder particles during sintering.

The glass frit may include an oxide containing Si. The oxide containing Si is a glass network former oxide, and may serve to improve a softening temperature and acid resistance of the glass frit. The oxide containing Si may be $SiO_2$.

When the content of Si is less than 0.55 wt % with respect to a total content of the Cu particles, a glass network structure is weak, so that acid resistance may be weakened, and when the content of Si exceeds 0.60 wt %, a softening temperature may be excessively increased.

Accordingly, in an embodiment, the content of Si may be 0.55 wt % or more and 0.60 wt % or less with respect to a total content of the Cu particles. Thereby, an appropriate softening temperature and acid resistance may be secured.

The glass frit may include an oxide containing Ba. The oxide containing Ba may serve to improve high-temperature workability of the glass frit and improve chemical durability. The oxide containing Ba may include BaO.

The glass frit may include an oxide containing Zn. The oxide containing Zn may serve to lower a melting point and a softening temperature of the glass frit, and may act as a reducing agent to serve to improve contact between Ni of an internal electrode and Cu of an external electrode. The oxide containing Zn may include ZnO.

The glass frit may include an oxide containing B. The oxide containing B may serve to reduce a transition temperature, a softening temperature of the glass frit, and the like. The oxide containing B may include $B_2O_3$.

Accordingly, the glass frit of the conductive paste according to an embodiment may further include an oxide containing at least one of Ba, Zn, and B. Accordingly, chemical durability, high-temperature workability, and contact with the internal electrode may be improved, and an appropriate transition temperature and softening temperature may be obtained.

According to an embodiment of the present disclosure, the glass frit may include an oxide containing alkali metal.

When the Cu particles of the conductive paste are sintered, empty spaces between the Cu particles may be filled with the glass frit. However, as an external electrode is thinned, necking between the Cu particles occurs more easily, but a probability that the glass frit cannot fill an inside of the Cu particles that are closed first increases.

Accordingly, as the external electrode is thinned, a content of the glass frit for improving density of the external electrode increases.

Meanwhile, as the content of the glass frit increases, the external electrode after sintering is more eroded by a plating solution, and accordingly, the moisture-resistance reliability of the multilayer electronic component may be deteriorated.

Accordingly, when an external electrode is formed by adding an acid-resistant glass frit including an oxide containing at least one of Ba, Zn, or B, to a conductive paste, the acid-resistant glass frit has low wettability with the Cu particles, so that agglomeration of glass components may occur, and a problem of forming a large amount of pores in the external electrode after sintering may occur.

According to an embodiment of the present disclosure, the glass frit may include an oxide containing alkali metal. Accordingly, density of the external electrode after sintering may be improved without excessively increasing a content of the glass frit.

Figure 5:
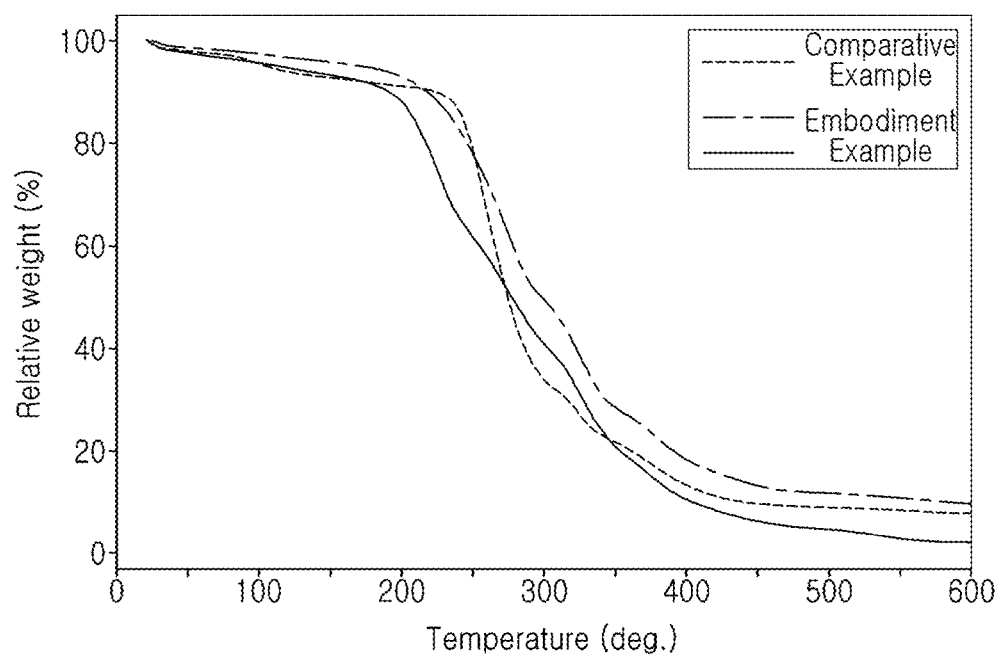
FIG. 5 is a graph illustrating a binder decomposition tendency according to whether or not an alkali metal oxide is added.

FIG. 5 is a graph illustrating a binder decomposition tendency according to whether or not alkali metal oxide is added.

Specifically, FIG. 5 illustrates that a relative weight of a binder included in the conductive paste is measured according to a temperature through a thermogravimetric analysis (TGA) method.

Referring to FIG. 5, in the case of Comparative Example in which no alkali metal oxide is added to a glass frit, it can be seen that a thermal decomposition initiation temperature of the binder is relatively high, and a degree of inclination of a curve changes rapidly.

Meanwhile, in the case of the present Example in which alkali metal oxide is added to the glass frit, it can be seen that the thermal decomposition initiation temperature of the binder is relatively low, and the degree of inclination of the curve changes more gradually compared to the Comparative Example.

Therefore, when the alkali metal oxide is added to the glass frit, the thermal decomposition initiation temperature of the binder included in the conductive paste is lowered and the binder is removed at a uniform rate, thereby suppressing rapid oxidation and rapid necking of the Cu particles. Accordingly, when an external electrode is formed by applying a conductive paste containing a glass frit to which an alkali metal oxide is added to a multilayer electronic component, which will be described later, the density of the external electrode is improved to suppress deterioration of insulation resistance (IR) and improve moisture-resistance reliability.

According to an embodiment of the present disclosure, a content of the alkali metal is preferably 0.16 wt % or more and 0.35 wt % or less with respect to a total content of the Cu particles.

When the content of the alkali metal is less than 0.16 wt % with respect to a total content of the Cu particles, a transition temperature (TG) of the glass frit decreases compared to a sintering initiation temperature of Cu, and thus it may be difficult to secure density of an electrode layer after sintering, and even when the content of the alkali metal exceeds 0.35 wt %, a role of a sintering aid by the alkali metal oxide is limited, so that it may be difficult to secure the density of the electrode layer after sintering, similarly.

Meanwhile, a type of alkali metals is not particularly limited. However, when the alkali metal is Li or K, it is possible to improve wettability of glass by lowering field strength. In addition, when the alkali metal is included in the glass, network coupling of glass may be partially broken, so that the transition temperature (Tg) of the glass may be adjusted.

In addition thereto, the conductive paste may include a binder and a solvent such as ethyl cellulose, nitrocellulose, and an acrylic-based resin, and a propellant, activator, or the like, if necessary.

Meanwhile, the conductive paste according to various embodiments of the present disclosure may be used when forming an electrode layer included in the external electrode of the multilayer electronic component according to various embodiments of the present disclosure to be described later.

However, it is not necessary to apply the conductive paste, and various compositions of the conductive paste improving the density of the electrode layer included in the external electrode to secure acid resistance and moisture-resistance reliability can be applied.

Multilayer Electronic Component

FIG. 1 is a perspective view schematically illustrating a multilayer electronic component according to an embodiment of the present disclosure.

Figure 2:
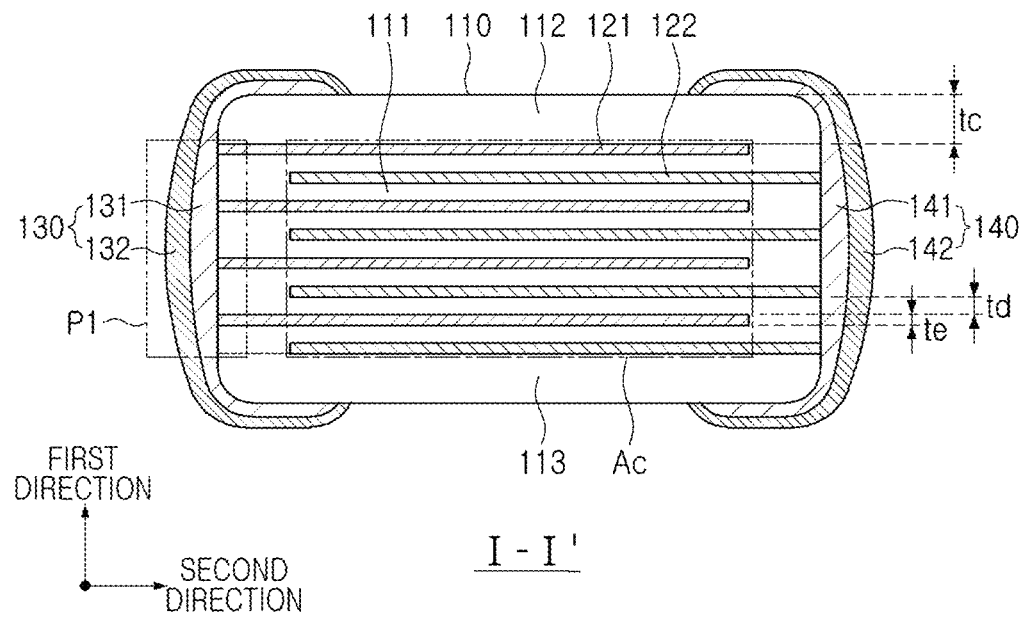
FIG. 2 is a cross-sectional view taken along line I-I' of FIG. 1.

FIG. 2 is a cross-sectional view taken along line I-I' of FIG. 1.

Figure 3:
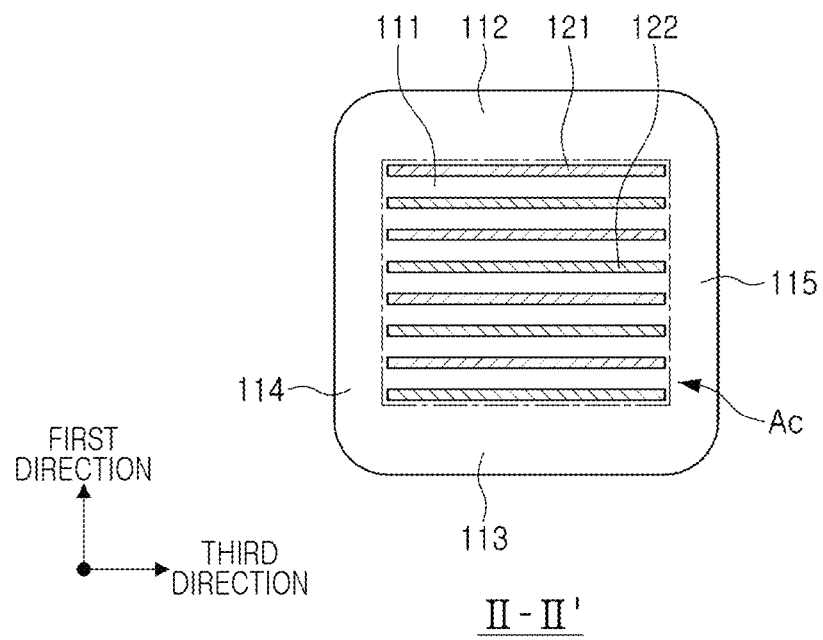
FIG. 3 is a cross-sectional view taken along line II-II' of FIG. 1.

FIG. 3 is a cross-sectional view taken along line II-II' of FIG. 1.

Figure 4:
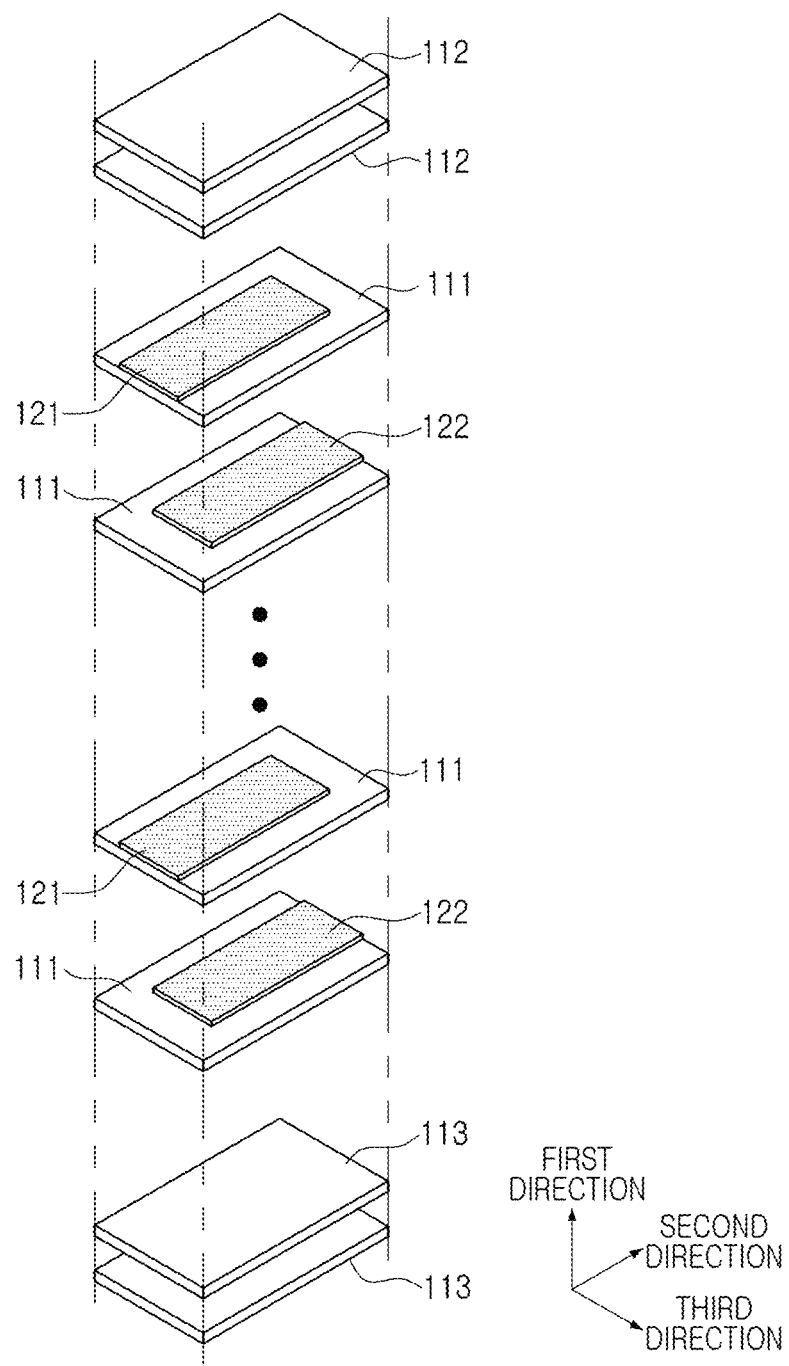
FIG. 4 is an exploded perspective view illustrating the body of FIG. 1 in a state of disassembly.

FIG. 4 is an exploded perspective view illustrating the body of FIG. 1 in a state of disassembly.

Hereinafter, a multilayer electronic component 100 according to an embodiment of the present disclosure will be described in detail with reference to FIGS. 1 to 4, but overlapping portions with those described in the above-described conductive paste are omitted to avoid overlapping descriptions.

Referring to FIGS. 1 to 4, the multilayer electronic component 100 according to an embodiment of the present disclosure includes a body 110 including a plurality of dielectric layers 111 and first and second internal electrodes 121 and 122 alternately disposed with the dielectric layers in a first direction; a first electrode layer 131 disposed outside the body and connected to the first internal electrode 121; and a second electrode layer 141 disposed outside the body and connected to the second internal electrode 122, wherein the first and second electrode layers 131 and 141 include metal and glass, the metal includes Cu, the glass includes an oxide containing alkali metal, and a content of the alkali metal is 0.069 wt % or more and 0.149 wt % or less with respect to a total a content of Cu.

The body 110 has a dielectric layers 111 and internal electrodes 121 and 122, alternately stacked.

A specific shape of the body 110 is not particularly limited, but as illustrated, the body 110 may have a hexahedral shape, or a shape similar thereto. Due to shrinkage of ceramic powder included in the body 110 during a sintering process, the body 110 may have a substantially hexahedral shape, but may not have a hexahedral shape having completely straight lines.

The body 110 may have first and second surfaces 1 and 2 opposing each other in a first direction (thickness direction), third and fourth surfaces 3 and 4 connected to the first and second surfaces 1 and 2 and opposing each other in a second direction (length direction), and fifth and sixth surfaces 5 and 6 connected to the first and second surfaces 1 and 2, connected to the third and fourth surfaces 3 and 4 and opposing each other in a third direction (width direction).

The plurality of dielectric layers 111 forming the body 110 are in a sintered state, and a boundary between adjacent dielectric layers 111 may be integrated, such that it may be difficult to confirm without using a scanning electron microscope (SEM).

A raw material for forming the dielectric layers 111 is not particularly limited, as long as sufficient electrostatic capacitance may be obtained therewith. For example, the raw material for forming the dielectric layers 111 may be a barium titanate ($BaTiO_3$)-based material, a lead composite perovskite-based material, a strontium titanate ($SrTiO_3$)-based material, or the like. The barium titanate-based material may include $BaTiO_3$-based ceramic powder, and the ceramic powder may include, for example, $BaTiO_3$, $(Ba_{1-x}Ca_x)TiO_3$ (wherein 0<x<1), $Ba(Ti_{1-y}Ca_y)O_3$ (wherein 0<y<1), $(Ba_{1-x}Ca_x)(Ti_{1-y}Zr_y)O_3$ (wherein 0<y<1) or $Ba(Ti_{1-y}Zr_y)O_3$ (wherein 0<y<1), in which calcium (Ca), zirconium (Zr), or the like, are partially dissolved in $BaTiO_3$, and the like.

In addition, various ceramic additives, organic solvents, plasticizers, binders, dispersants, and the like, may be added to powder such as barium titanate ($BaTiO_3$) as a raw material for forming the dielectric layers 111 according to the purpose of the present disclosure.

Meanwhile, an average thickness "td" of the dielectric layers 111 is not particularly limited.

However, in general, when the dielectric layer is formed to have a thickness of less than 0.6 μm, in particular, when the thickness of the dielectric layer is 0.35 μm or less, there was a concern that reliability may be deteriorated.

According to an embodiment of the present disclosure, by adjusting a content of an alkali metal to 0.069 wt % or more and 0.149 wt % or less with respect to a total a content of Cu, density of the first and second electrode layers 131 and 141 may be secured, so that, even when the average thickness "td" of the dielectric layers 111 is 0.35 μm or less, the reliability of the multilayer electronic component 100 may be improved.

The average thickness "td" of the dielectric layers 111 may mean an average thickness of the dielectric layers 111 disposed between the first and second internal electrodes 121 and 122.

The average thickness of the dielectric layers 111 may be measured from an image obtained by scanning a cross section of the body 110 in the length and thickness directions (L-T) with a scanning electron microscope (SEM) of 10,000 magnifications. More specifically, an average value may be measured by measuring thicknesses of one dielectric layer at 30 points positioned at equal intervals in the length direction in the obtained image. The 30 points positioned at equal intervals may be designated in the capacitance formation portion Ac. In addition, when an average value is measured by extending the average value to 10 dielectric layers, the average thickness of the dielectric layers may further be generalized.

Meanwhile, the body 110 may include a capacitance formation portion Ac, disposed in the body 110 and including a first internal electrode 121 and a second internal electrode 122 disposed to face each other with the dielectric layer 111 interposed therebetween, and cover portions 112 and 113, disposed above and below the capacitance formation portion Ac, respectively.

In addition, the capacitance formation portion Ac, which contributes to formation of capacitance of a capacitor, may be formed by repeatedly laminating a plurality of first and second internal electrodes 121 and 122 with the dielectric layer 111 interposed therebetween.

The upper cover portion 112 and the lower cover portion 113 may be formed by laminating a single dielectric layer or two or more dielectric layers on upper and lower surfaces of the capacitance formation portion Ac, respectively, in the thickness direction, and may basically serve to prevent damage to the internal electrodes caused by physical or chemical stress.

The upper cover portion 112 and the lower cover portion 113 may include the band electrodes 123 and 124, but may not include the internal electrodes, and may include the same material as the materials used for the dielectric layers 111.

That is, the upper cover portion 112 and the lower cover portion 113 may include a ceramic material, for example, a barium titanate ($BaTiO_3$)-based ceramic material.

Meanwhile, an average thickness "tc" of the cover portions 112 and 113 does not need to be particularly limited. However, the average thickness "tc" of the cover portion 112 or 113 may be 15 μm or less to more easily achieve the miniaturization and the high capacitance of the multilayer electronic component. In addition, according to an embodiment, since the density of the first and second electrode layers may be secured by adjusting the content of the alkali metal to 0.069 wt % or more and 0.149 wt % or less with respect to a total content the content of Cu, and even when the average thickness "tc" of the cover portions 112 and 113 is 15 μm or less, the reliability of the multilayer electronic component may be improved.

The average thickness "tc" of the cover portion 112 or 113 may refer to a size in the first direction, and may be an average value of sizes, in the first direction, of the upper cover portion 112 measured at five points disposed at equal intervals above or below the capacitance formation portion Ac.

In addition, margin portions 114 and 115 may be disposed on a side surface of the capacitance formation portion Ac.

The margin portions 114 and 115 may include a margin portion 114 disposed on the fifth surface 5 of the body 110, and a margin portion 115 disposed on the sixth surface 6 of the body 110. That is, the margin portions 114 and 115 may be disposed on both side surfaces of the ceramic body 110 in the width direction.

The margin portions 114 and 115 may refer to regions between both ends of the first and second internal electrodes 121 and 122 and a boundary surface of the body 110 in a cross-section of the body 110 taken in the width-thickness (W-T) directions, as illustrated in FIG. 3.

The margin portions 114 and 115 may basically serve to prevent damage to the internal electrodes caused by physical or chemical stress.

The margin portions 114 and 115 may be formed by applying a conductive paste to ceramic green sheets, except for places in which the margin portions are to be formed to form the internal electrodes.

In addition, to suppress a step formed by the internal electrodes 121 and 122, the margin portions 114 and 115 may be formed by laminating ceramic green sheets, cutting the laminated ceramic green sheets to expose the internal electrodes to the fifth and sixth surfaces 5 and 6 of the body 110, and then laminating a single dielectric layer or two or more dielectric layers on both side surfaces of the capacitance formation portion Ac in the width direction.

Meanwhile, a width of the margin portions 114 and 115 does not need to be limited. However, an average width of the margin portions 114 or 115 may be 15 μm or less to more easily achieve miniaturization and high capacitance of the multilayer electronic component. In addition, according to an embodiment of the present disclosure, since the density of the first and second electrode layers 131 and 141 may be secured by adjusting the content of the alkali metal to 0.069 wt % or more and 0.149 wt % or less with respect to a total content of Cu, and even the average thickness of the margin portions 114 and 115 is 15 μm or less, the reliability of the multilayer electronic component 100 may be improved.

The internal electrodes 121 and 122 may be laminated alternately with the dielectric layer 111.

The internal electrodes 121 and 122 may include first and second internal electrodes 121 and 122. The first and second internal electrodes 121 and 122 may be alternately disposed to face each other with the dielectric layer 111, constituting the body 110, interposed therebetween, and may be exposed to the third and fourth surfaces 3 and 4 of the body 110, respectively.

Referring to FIG. 2, the first internal electrode 121 may be spaced apart from the fourth surface 4 and may be exposed through the third surface 3, and the second internal electrode 122 may be spaced apart from the third surface 3 and may be exposed through the fourth surface 4.

In this case, the first and second internal electrodes 121 and 122 may be electrically separated from each other by the dielectric layer 111 disposed therebetween.

Referring to FIG. 3, the body 110 may be formed by alternately stacking a ceramic green sheet on which the first internal electrode 121 is printed and a ceramic green sheet on which the second internal electrode 122 is printed, followed by sintering.

A material for forming the internal electrodes 121 and 122 are not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) or an alloy thereof on a ceramic green sheet. A method for printing the conductive paste for the internal electrodes may be a screen printing method, a gravure printing method, or the like, but the present disclosure is not limited thereto.

Meanwhile, an average thickness "td" of the internal electrodes 121 and 122 does not need to be particularly limited.

However, in general, when the internal electrode is formed to have a thickness of less than 0.6 µm, in particular, when the thickness of the internal electrode is 0.35 µm or less, there was a concern that reliability may be deteriorated.

According to an embodiment of the present disclosure, since the density of the first and second electrode layers by adjusting the content of the alkali metal to 0.069 wt % or more and 0.149 wt % or less with respect to a total content of Cu, and even when the average thickness of the internal electrodes 121 and 122 is 0.35 µm or less, the reliability of the multilayer electronic component may be improved.

Accordingly, when the internal electrodes 121 and 122 have an average thickness of 0.35 µm or less, an effect according to the present disclosure may be more remarkable, and miniaturization and high capacitance of the multilayer electronic component may be more easily achieved.

An average thickness "te" of the internal electrodes 121 and 122 may mean an average thickness of the internal electrodes 121 and 122.

The average thickness of the internal electrodes 121 and 122 may be measured by scanning an image of a cross-section of the body 110 in length and thickness directions (L-T directions) with a scanning electron microscope (SEM) with a magnification of 10,000. More specifically, an average value may be measured by measuring a thickness of one internal electrode at 30 equally spaced points in the length direction from the scanned image. The 30 points having equal intervals may be designated in the capacitance formation portion Ac. In addition, when the average value is measured by extending the average value measurement to 10 internal electrodes, the average thickness of the internal electrodes can be more generalized.

The external electrodes 130 and 140 may be disposed on the body 110 and connected to the internal electrodes 121 and 122.

As illustrated in FIG. 2, the external electrodes 130 and 140 may include first and second external electrodes 130 and 140, respectively disposed on the third and fourth surfaces 3 and 4 of the body 110, and respectively connected to the first and second internal electrodes 121 and 122.

In the present embodiment, a structure in which the multilayer electronic component 1000 has two external electrodes 130 and 140 is described. However, the number and shape of the external electrodes 130 and 140 may be changed according to the shape of the internal electrodes 121 and 122 or other purposes.

Meanwhile, the external electrodes 130 and 140 may be formed using any material as long as they have electrical conductivity, such as metal, and a specific material may be determined in consideration of electrical characteristics and structural stability, and furthermore, the external electrodes 130 and 140 may have a multilayer structure.

For example, the external electrodes 130 and 140 may include electrode layers 131 and 141 disposed on the body 110 and plating layers 132 and 142 disposed on the plating layers.

Meanwhile, the electrode layers 131 and 141 may include a first electrode layer 131 disposed outside the body 110 and connected to the first internal electrode 121 and a second electrode layer 141 disposed outside the body and connected to the second internal electrode 122.

Specifically, the first and second electrode layers 131 and 141 may be disposed on some surfaces of the body to be in direct contact with each of the first and second internal electrodes to secure electrical connectivity.

According to an embodiment of the present disclosure, the first and second electrode layers 131 and 141 may include metal and glass, and the metal includes Cu.

When the first and second electrode layers 131 and 141 include Cu as metal, an atmosphere during sintering of the first and second electrode layers 131 and 141 may be easily adjusted. Specifically, in an atmosphere for preventing oxidation of nickel metal included in the internal electrodes 121 and 122 and reduction of $BaTiO_3$ included in dielectric layers 111, the first and second electrode layers 131 and 141 may be sintered.

In addition, the first and second electrode layers 131 and 141 may be formed by printing, transferring, or dipping a conductive paste including the metal, onto the body 110, but an embodiment thereof is not limited thereto.

The first and second plating layers 132 and 142 may be disposed on the first and second electrode layers 131 and 141, respectively. According to an embodiment of the present disclosure, the first plating layer 132 may be disposed on the first electrode layer 131, and the second plating layer 142 may be disposed on the second electrode layer 141. The first and second plating layers 132 and 142 may serve to improve mounting characteristics.

A type of the plating layers 132 and 142 is not particularly limited, and may be a plating layer including at least one of Cu, Ni, Sn, Ag, Au, Pd, or alloys thereof, and may include a plurality of layers.

As a more specific example of the plating layers 132 and 142, the plating layers 132 and 142 may include a Ni plating layer or a Sn plating layer, and may have a structure in which a Ni plating layer and a Sn plating layer are sequentially formed on the electrode layers 131 and 141, and may have a structure in which a Sn plating layer, a Ni plating layer, and a Sn plating layer are sequentially formed. In addition, the plating layers 132 and 142 may include a plurality of Ni plating layers and/or a plurality of Sn plating layers.

Meanwhile, the first and second electrode layers 131 and 141 according to an embodiment of the present disclosure include glass, and the glass includes an oxide containing an alkali metal.

The glass may serve to secure sinterability between metal particles when the first and second electrode layers 131 and 141 are sintering electrodes formed by sintering a conductive paste.

Components included in the glass may be the same as those included in a glass frit of the conductive paste according to an embodiment and various embodiments of the present disclosure described above. The glass frit may be filled between Cu particles, thereby contributing to securing sinterability and improving mechanical strength.

Meanwhile, when the first and second electrode layers 131 and 141 are thinned and a content of the glass frit in the conductive paste needs to be increased to secure sinterability, erosion by the plating solution may occur, and even when an acid-resistant glass frit is used, wettability with the Cu particles is low, which may cause glass agglomeration. Accordingly, after sintering, when a large amount of pores are generated in the first and second electrode layers 131 and 141, to form first and second plating layers 132 and 142 on the first and second electrode layers 131 and 141, respectively, the reliability of the multilayer electronic component 100 may be lowered due to erosion by the plating solution.

According to an embodiment of the present disclosure, since the glass includes an oxide containing an alkali metal, sinterablity may be secured even without an excessive amount of glass compared to Cu, and since wettability with the Cu particles is excellent, a phenomenon of glass agglomeration may also be suppressed. Accordingly, it is possible to suppress the formation of a large amount of pores in the first and second electrode layers 131 and 141, thereby improving the reliability of the multilayer electronic component 100 due to erosion of the plating solution.

According to an embodiment of the present disclosure, a content of the alkali metal is 0.069 wt % or more and 0.149 wt % or less with respect to a total amount of Cu. Accordingly, it is possible to form the dense first and second electrode layers 131 and 141 without an excessive increase in the glass component, thereby improving the moisture-resistance reliability of the multilayer electronic component 100.

When the content of the alkali metal is less than 0.069 wt % with respect to a total content of Cu, a transition temperature (Tg) of the glass frit is lowered compared to a sintering initiation temperature of Cu, which prevents sintering. As a result, the density of the first and second electrode layers 131 and 141 may be lowered. When the content of the alkali metal, compared to the content of Cu, exceeds 0.149 wt %, a role of a sintering aid by the alkali metal oxide is limited, so that the density of the first and second electrode layers 131 and 141 may be lowered.

When the first and second electrode layers 131 and 141 are formed using the conductive paste according to an embodiment and various embodiments of the present disclosure, the first and second electrode layers may include a metal and glass, the metal may include Cu, and the glass may include an oxide containing alkali metal.

In addition, a type of the alkali metal is not particularly limited. However, when the alkali metal is Li or K, it is possible to improve the wettability of the glass by lowering the field strength. In addition, when alkali metal is included in the glass, some of the network coupling of the glass may be broken, so that the transition temperature (Tg) of the glass can be adjusted.

In an embodiment, the glass may include an oxide containing at least one of Ba, Zn, or B. Accordingly, by improving acid resistance of the glass may be improved to improve moisture-resistance reliability and acid resistance of the multilayer electronic component. Meanwhile, to improve the acid resistance, when the glass includes an oxide containing at least one of Ba, Zn, or B, since the wettability with Cu particles is low, a phenomenon in which glass components are agglomerate, may occur, and a problem of forming a large amount of pores in the first and second electrode layers 131 and 141 after sintering may occur.

However, according to an embodiment of the present disclosure, the glass includes an oxide containing an alkali metal, a content of the alkali metal may satisfy 0.069 wt % or more and 0.149 wt % or less with respect to a total content of Cu to improve the density of the first and second electrode layers 131 and 141, to suppress the formation of pores. Accordingly, when the glass includes an oxide containing at least one of Ba, Zn, or B, an effect of improving the acid resistance and moisture-resistance reliability of the multilayer electronic component according to an embodiment of the present disclosure may be more remarkable.

An average thickness of the first and second electrode layers 131 and 141 is not particularly limited. However, the average thickness of the first and second electrode layers 131 and 141 may be 20 µm or less in order to more easily achieve miniaturization and high capacitance of the multilayer electronic component. However, when the thickness of the first and second electrode layers 131 and 141 is less than 5 µm, a proportion of glass may be increased so that there is a concern that reliability may be reduced to secure sinterability.

Accordingly, the average thickness of the first and second electrode layers 131 and 141 may be 5 µm or more and 20 µm or less, and more preferably 7 µm or more and 15 µm or less.

Meanwhile, an average thickness of the cover portions 112 and 113 does not need to be particularly limited. However, an average thickness "tc" of the cover portion 112 or 113 may be 15 µm or less to more easily achieve the miniaturization and the high capacitance of the multilayer electronic component. In addition, according to an embodiment, when an insulating layer is disposed on an external electrode according to an embodiment of the present disclosure, permeation of external moisture and permeation of a plating solution may be prevented to improve reliability. Therefore, improved reliability may be ensured even when the average thickness "tc" of the cover portions 112 or 113 is 15 µm or less.

Figure 13:
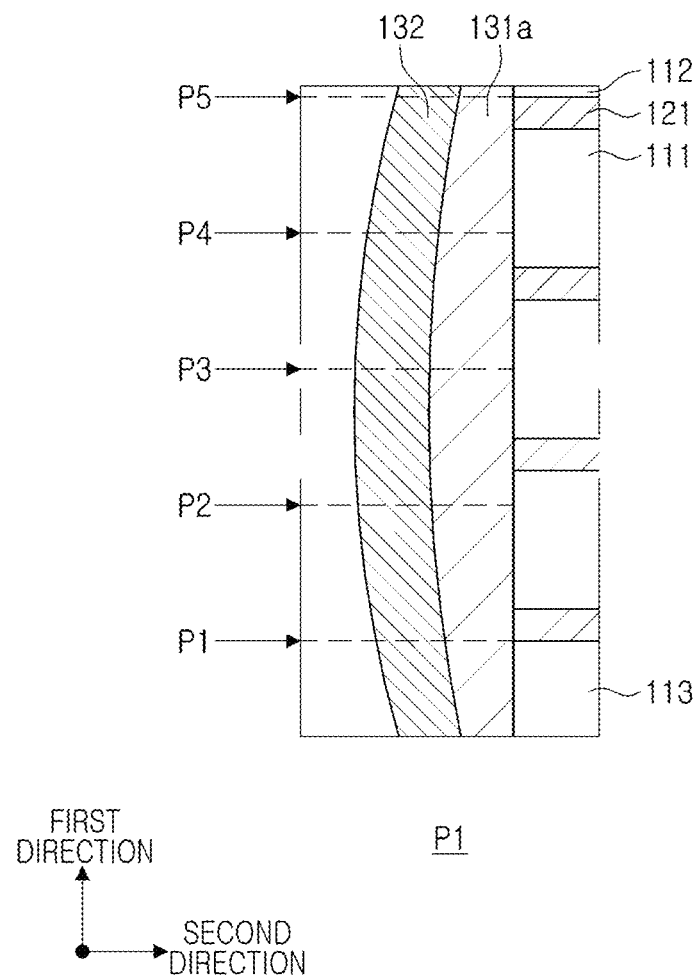
FIG. 13 is an enlarged view of area P1 of FIG. 2.

FIG. 13 is an enlarged view of area P1 of FIG. 2.

Referring to FIG. 13, an average thickness of the first electrode layer 131 may be measured by observing a cross-section thereof taken in the first and second directions (L-T directions) in a central portion in the third direction, and may be a value obtained by averaging sizes of the first connection portion 131a in the second direction measured at five points at equal intervals, in the first direction. Specifically, in the cross-section thereof taken in the length direction (second direction) and the thickness direction (first direction) from a central portion of the body in the width direction (third direction), the value may be an average value of the size of the first connection portion 131a in the second direction at five points P1, P2, P3, P4, and P5 having equal intervals in the first direction from the lowermost internal electrode to the uppermost internal electrode 121, and the average thickness of the second electrode layer 141 may also be measured similarly.

A size of the multilayer electronic component 100 does not need to be particularly limited.

However, to achieve both miniaturization and high capacitance, since the number of laminated layers should be increased by thinning dielectric layers and internal electrodes, an effect of improving reliability and capacitance per unit volume may become more remarkable in the multilayer electronic component 300 having a size of 1005 (length×width, 1.0 mm×0.5 mm).

Accordingly, when the multilayer electronic component 1000 has a length of 1.1 mm or less and a width of 0.55 mm or less in consideration of a manufacturing error, a size of an external electrode, and the like, a reliability improvement effect according to the present disclosure may be more remarkable. Here, the length of the multilayer electronic component 1000 may refer to a maximum size of the multilayer electronic component 1000 in the second direction, and the width of the multilayer electronic component 1000 may refer to a maximum size of the multilayer electronic component 1000 in the third direction.

Hereinafter, a multilayer electronic component 100' according to an embodiment will be described in detail with reference to FIGS. 8 and 9. However, descriptions of the configurations overlapping with those described in the above-described multilayer electronic component will be omitted to avoid overlapping descriptions.

Figure 8:
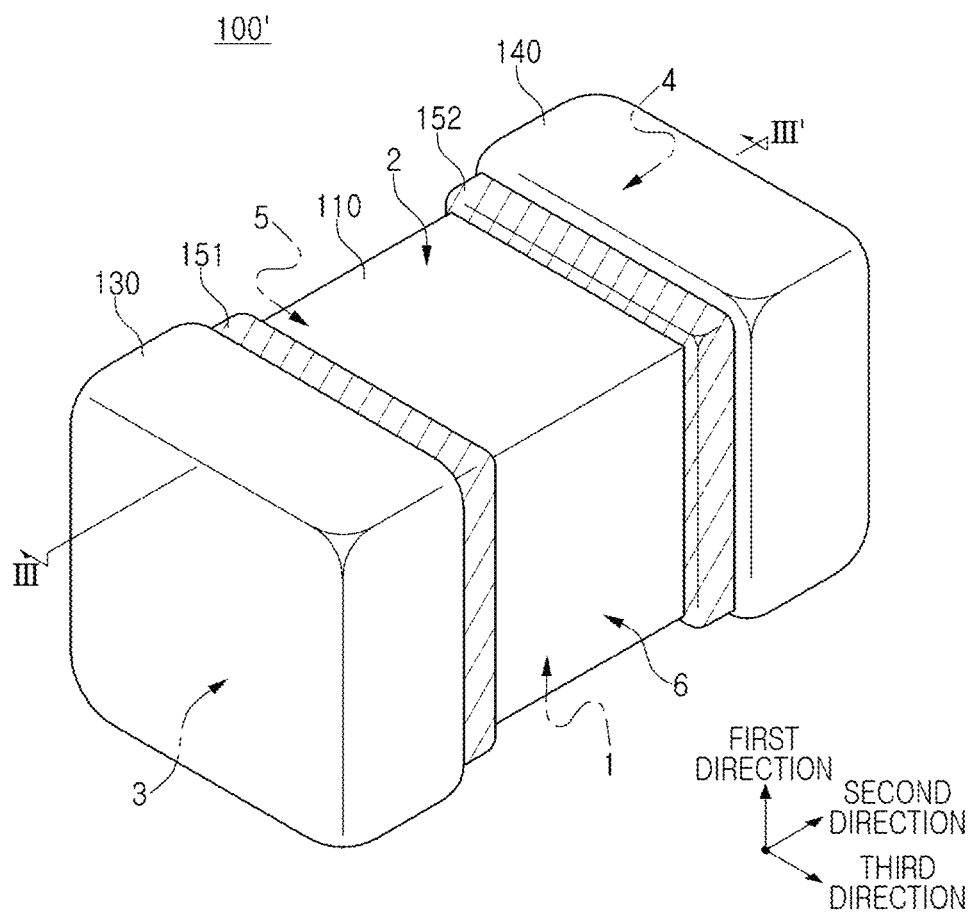
FIG. 8 is a perspective view schematically illustrating a multilayer electronic component according to an embodiment of the present disclosure.

Referring to FIG. 8, in a multilayer electronic component 100', the first electrode layer 131 includes a first connection portion 131a disposed on the third surface 3 and connected to the first internal electrode 122, and a first band portion 131b extending from the first connection portion to a portion of the first, second, fifth, and sixth surfaces 1, 2, 5, and 6, the second electrode layer 141 includes a second connection portion 141a disposed on the fourth surface and connected to the second internal electrode 122, and a second band portion 141b extending from the second connection portion to a portion of the first, second, fifth, and sixth surfaces, a first sealing portion 151 disposed to extend from an end of the first band portion to a portion on an outer surface of the body; and a second sealing portion 152 disposed to extend from an end of the second band portion to a portion on an outer surface of the body.

In the multilayer electronic component 100' according to an embodiment, the first electrode layer 131 may include a first connection portion 131a disposed on the third surface 3 and connected to the first internal electrode 121, and a first band portion 131b extending from the first connection portion to a portion of the first, second, fifth, and sixth surfaces 1, 2, 5, and 6, and the second electrode layer 141 may include a second connection portion 141a disposed on the fourth surface and connected to the second internal electrode 122, and a second band portion 141b extending from the second connection portion to a portion of the first, second, fifth, and sixth surfaces.

The first and second connecting portions 131a and 141a directly contact the first and second internal electrodes 121 and 122, respectively, and serve to secure electrical conduction.

The first and second band portions 131b and 141b are disposed to extend from the first and second connection portions 131a and 141a, respectively, to a portion of at least one of the first, second, fifth, and sixth surfaces 1, 2, 5, and 6 of the body 110 to secure mountability, to serve to improve mechanical strength of the multilayer electronic component 100'.

Meanwhile, since the first and second band portions 131b and 141b are disposed to extend to a portion of the first, second, fifth, and sixth surfaces of the body, an end of the band portion may be disposed on the body. The ends of the first and second band portions 131b and 141b may be a path for external moisture permeation, and may be a main path for a plating solution to permeate during plating.

In addition, since a thickness of the first and second band portions 131b and 141b gradually decreases, toward the ends of the first and second band portions 131b and 141b, the ends of the first and second band portions 131b and 141b may be vulnerable to permeation of external moisture and erosion of the plating solution.

In addition, when the first and second electrode layers 131 and 141 are sintered electrodes including metal and glass, and when density of the first and second electrode layers 131 and 141 is insufficient, the first and second electrode layers 131 and 141 may be more vulnerable to permeation of external moisture and erosion of the plating solution.

Figure 9:
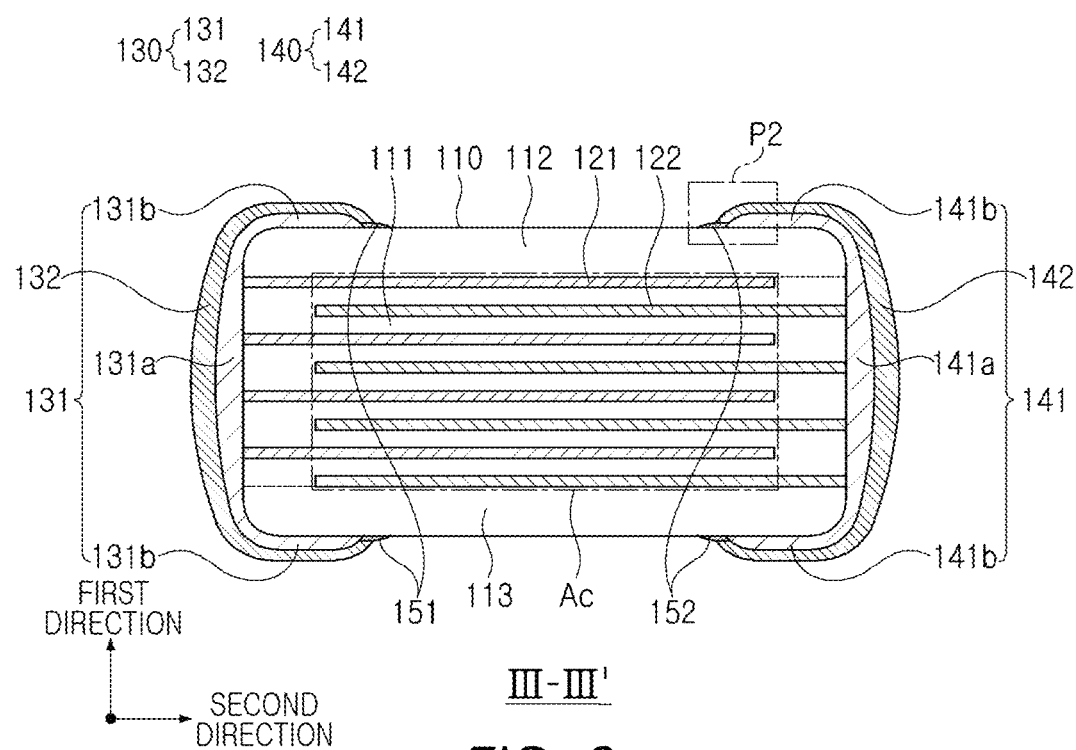
FIG. 9 is a cross-sectional view taken along line III-III' of FIG. 8.
Figure 10:
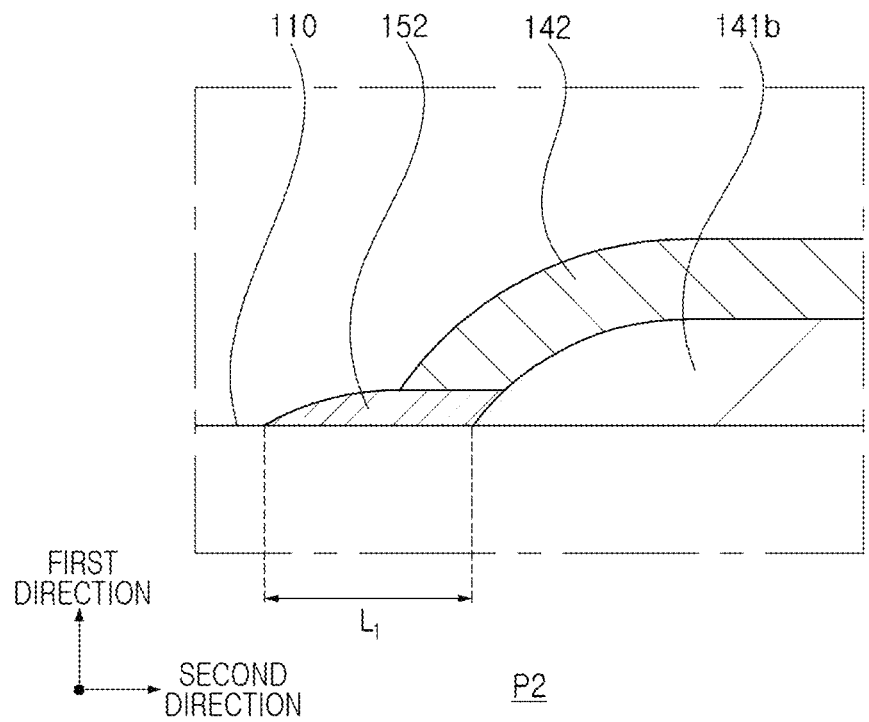
FIG. 10 is an enlarged view of area P2 of FIG. 9.

FIG. 9 is a cross-sectional view taken along line III-III' of FIG. 8, and FIG. 10 is an enlarged view of area P2 of FIG. 9.

Referring to FIGS. 9 and 10, a multilayer electronic component 100' according to an embodiment includes a first plating layer 132 disposed on the first electrode layer 131; and a second plating layer 142 disposed on the second electrode layer 141, wherein the first plating layer may be disposed to cover at least a portion of the first sealing portion 151, and the second plating layer may be disposed to cover at least a portion of the second sealing portion 152.

Figure 12A:
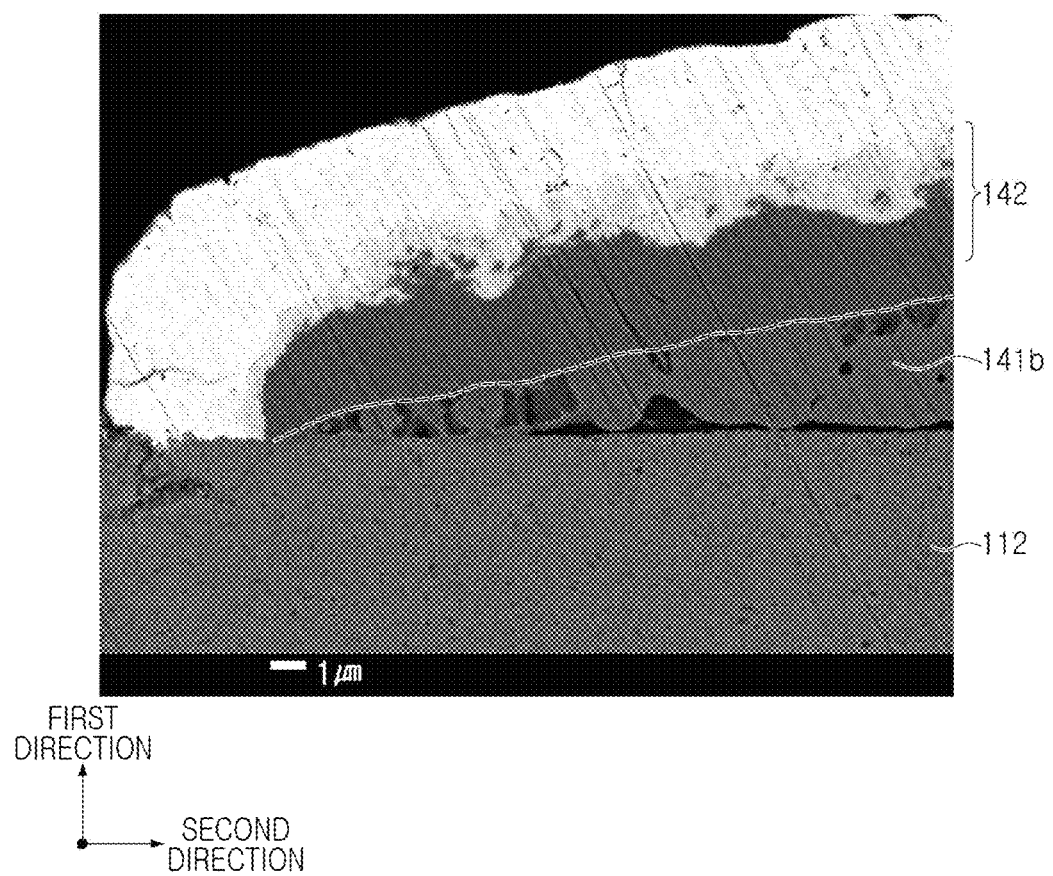
FIGS. 12A and 12B are images obtained by observing a shape in which a plating layer is disposed according to whether or not a sealing portion is formed with a scanning electron microscope.
Figure 12B:
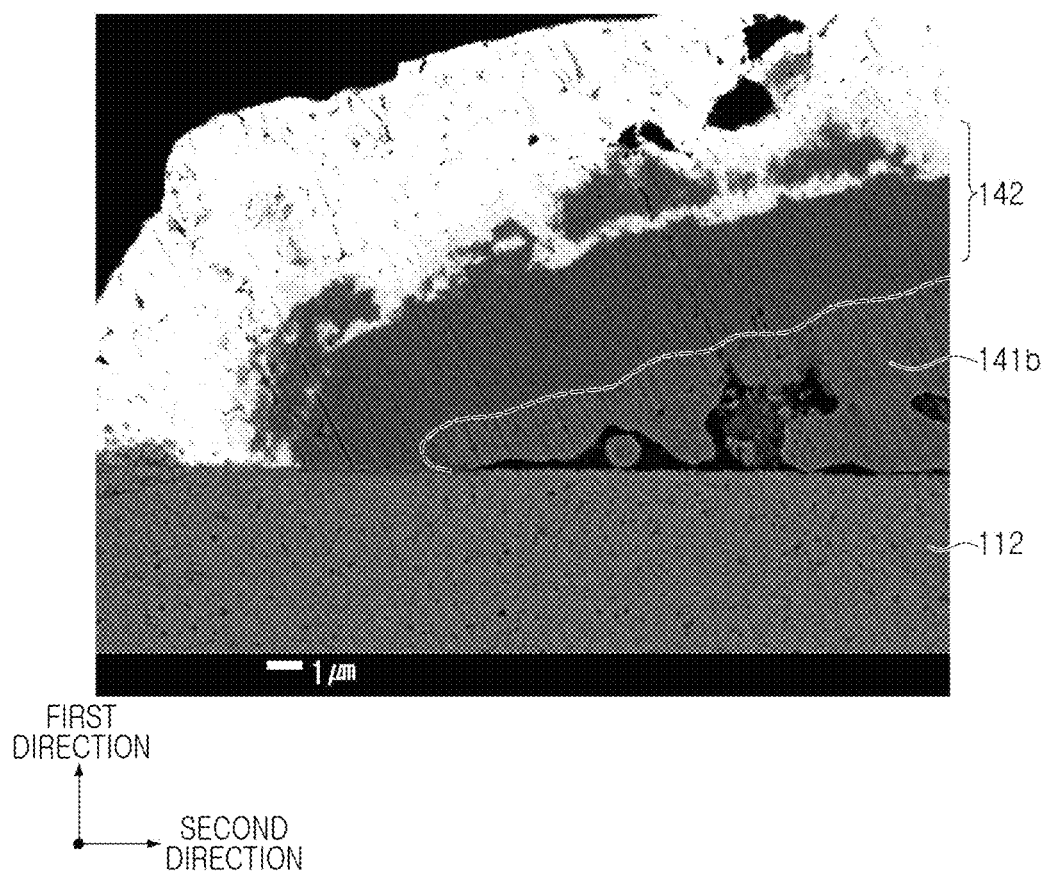

FIGS. 12A and 12B are images obtained by observing a shape in which a plating layer is disposed according to whether or not a sealing portion is formed with a scanning electron microscope.

FIG. 12A is a view illustrating a case in which first and second plating layers 132 and 142 are formed on the first and second electrode layers 131 and 141 in a state in which the first and second sealing portions 151 and 152 formed at ends of the first and second band portions 131b and 141b.

Referring to FIG. 12, when plating is completed before the first and second sealing portions 151 and 152 are completely eroded by a plating solution, the plating solution does not erode ends of the first and second band portions 131b and 141b. That is, a phenomenon in which the plating solution is permeated into the end of the first and second band portions 131b and 141b by the first and second sealing portions 151 and 152 may be delayed and buffered.

Accordingly, the first and second plating layers 132 and 142 may not extend to a gap between the first and second band portions 131b and 142b are in contact with the body 110. In other words, the first plating layer 132 may be disposed to cover at least a portion of the first sealing portion 151, and the second plating layer 142 may be disposed to cover at least a portion of the second sealing portion 152.

Accordingly, the phenomenon in which the first and second sealing portions 151 and 152 may mitigate or suppress the phenomenon in which the plating solution is permeated into the gap between the first and second band portions 131b and 141b and the body 110, to improve moisture-resistance reliability of the multilayer electronic component 100' and acid resistance to the plating solution may be improved.

On the other hand, FIG. 12 illustrates a case in which first and second plating layers 132 and 142 are formed in a state in which the first and second sealing portions 151 and 152 are not formed, and since the first and second plating layers 132 and 142 are directly formed at the ends of the first and second band portions 131b and 141b, it can be confirmed that it is permeated into the gap between the first and second band portions 131b and 141b and the body 110 may not be suppressed.

A lower limit of an average length L1 of the first and second sealing portions 151 and 152 is not particularly limited, and is preferably formed sufficiently to block a path through which external moisture or a plating solution may permeate into the body 110.

Meanwhile, the average length L1 of the first and second sealing portions 151 and 152 is preferably 5 μm or less, but is not particularly limited, and may vary depending on a content of glass included in the first and second electrode layers 131 and 141.

Meanwhile, the average length L1 of the first and second sealing portions 151 and 152 may be measured from an image obtained by scanning a cross-section thereof in first and second directions (L-T) directions, with a scanning electron microscope (SEM) of 10,000 magnifications. More specifically, a second sealing portion 152 may exist in first to fourth quadrants in the scanned image, and an average value may be measured by measuring a maximum length of the four first and second sealing portions. In addition, by measuring the average length L1 of the first and second sealing portions in the cross-section in the first and second directions (L-T) directions cut at 10 random points in the third direction, it may further be generalized.

Figure 11A:
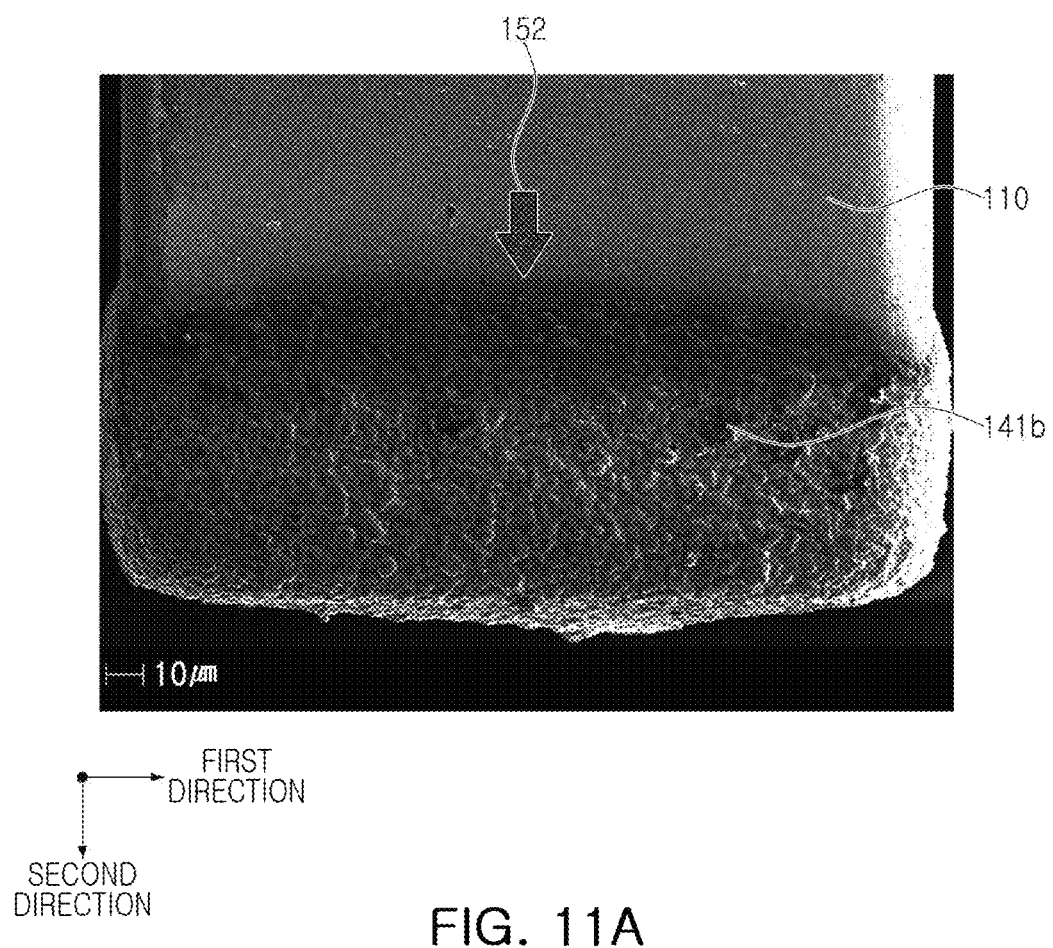
FIGS. 11A and 11B are images of a sealing portion formed at an end of a band portion of the electrode layer.
Figure 11B:
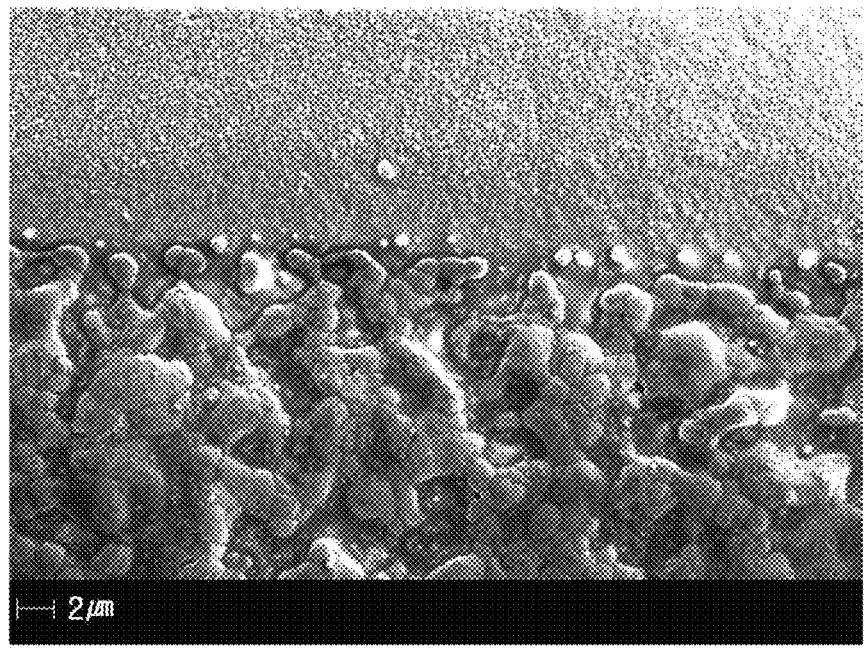
Figure 11B:
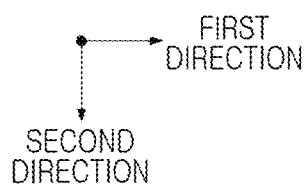

FIGS. 11A and 11B are images of a sealing portion formed at an end of a band portion of an electrode layer.

FIGS. 11A and 11B illustrate a case in which glass included in the electrode layer includes an oxide containing an alkali metal, and in FIGS. 11A and 11B, it can be confirmed that first and second sealing portions 151 and 152 disposed to extend from ends of first and second band portions 131b and 141b to a portion on an outer surface of the body 110.

Components of the first and second sealing portions 151 and 152 are not particularly limited. However, the first and second sealing portions 151 and 152 may be formed while a glass component included in the first and second electrode layers 131 and 141 is wetted into the surface of the body 110.

Accordingly, in an embodiment, the first and second sealing portions 151 and 152 may include the same material as the glass included in the first and second electrode layers 131 and 141, so that it is possible to improve moisture-resistance reliability of a multilayer electronic component 100' and acid resistance to a plating solution.

EXAMPLE

A conductive paste was prepared by mixing Cu particles and an organic vehicle in a glass frit to which $Li_2O$ and $K_2O$ were added.

After a hydrophobic plasma treatment is performed on the body 110 after sintering including first and second internal electrodes 121 and 122 alternately disposed with the dielectric layer 111, the prepared paste was spread on a surface plate, and the conductive paste was applied and dried on an outside of the body 110.

Thereafter, the conductive paste was sintered at 650° C. to 900° C. to form first and second electrode layers 131 and 141 to prepare samples.

Thereafter, each sample was immersed in a Ni plating solution, and the number of pores formed in the electrode layers 131 and 141 for each test number was measured to confirm density of the electrode layer.

Table 1 below illustrates the density evaluation by measuring the number of pores formed in the electrode layers 131 and 141 after sintering according to a ratio of a content of Cu particles and a content of alkali metal included in the conductive paste.

Figure 6A:
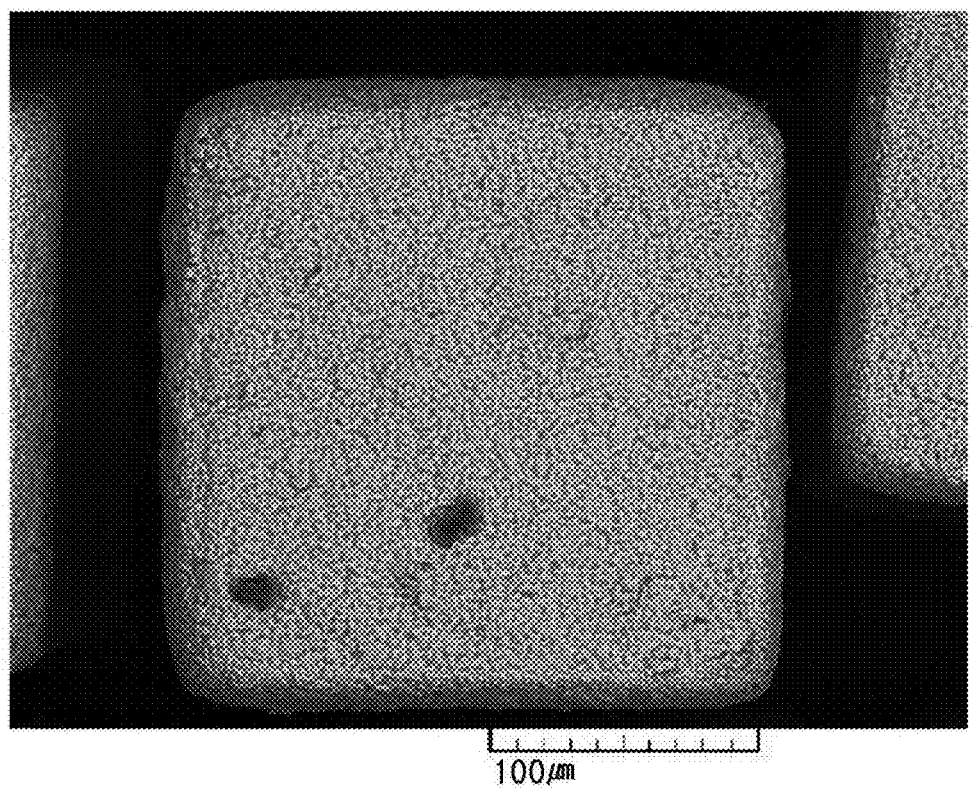
FIGS. 6A and 6B are images obtained by observing density of an electrode layer according to whether or not an alkali metal oxide is added with a scanning electron microscope.
Figure 6B:
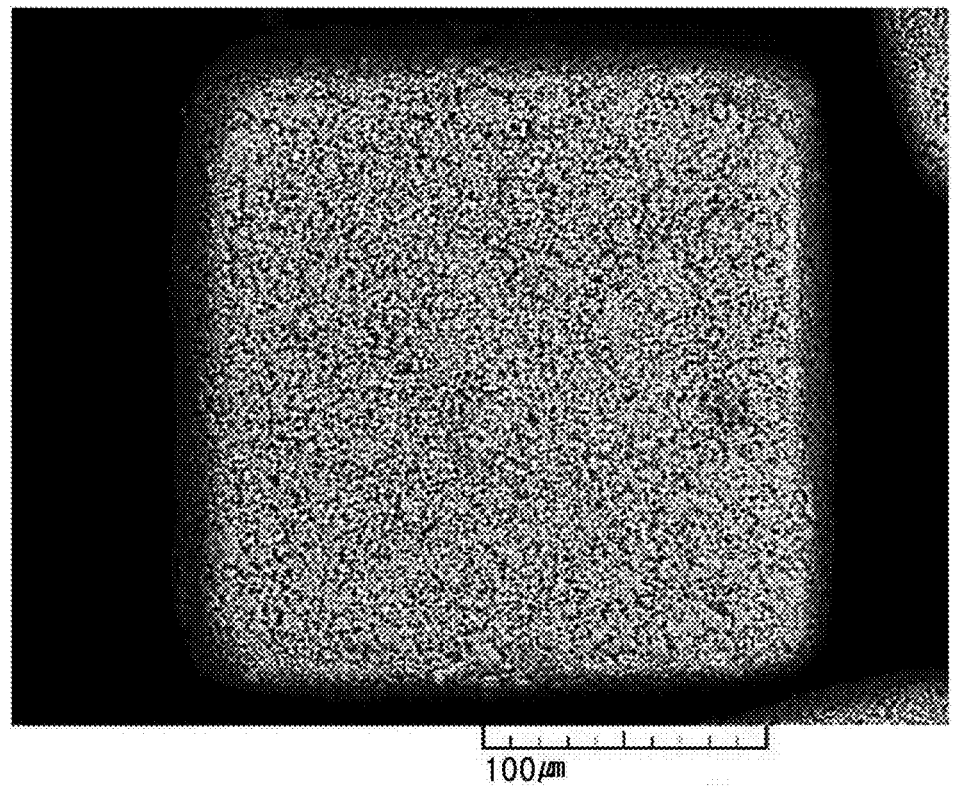

FIGS. 6A and 6B are images obtained by observing density of an electrode layer according to whether or not an alkali metal oxide is added with a scanning electron microscope.

The number of pores formed in the electrode layer was obtained by adjusting contrast/brightness of an image of a cross-section of a sample having 0402 size in first and third directions (W-T directions) with a scanning electron microscope (SEM) with a magnification of 500 using an ImageJ program, so that the number of relatively dark portions was measured.

Referring to FIGS. 6A and 6B, FIG. 6A illustrates a case in which a glass frit includes an alkali metal, and in FIG. 6A, it can be seen that the number of pores (dark portions) is small, and FIG. 6B illustrates a case in which a glass frit does not include an alkali metal, and in FIG. 6B, it can be seen that the number of pores (dark portions) is increased, compared to FIG. 6A.

In this case, the number of pores was measured in the same manner using images taken from 9 random samples per test number, and then an average value thereof was obtained.

TABLE 1

| Test No. | Cu (g) | Si (g) | Li (g) | K (g) | Alkali metal (g) | The number of pores |
|---|---|---|---|---|---|---|
| 1 | 100 | 0.52 | 0 | 0 | 0 | 250 |
| 2 | 100 | 0.54 | 0.07 | 0.05 | 0.12 | 188 |
| 3 | 100 | 0.55 | 0.09 | 0.07 | 0.16 | 47 |
| 4 | 100 | 0.57 | 0.13 | 0.10 | 0.23 | 5 |
| 5 | 100 | 0.59 | 0.17 | 0.13 | 0.30 | 23 |
| 6 | 100 | 0.60 | 0.20 | 0.15 | 0.35 | 38 |
| 7 | 100 | 0.65 | 0.32 | 0.24 | 0.57 | 53 |
| 8 | 100 | 0.72 | 0.52 | 0.39 | 0.91 | 162 |
| 9 | 100 | 1.02 | 1.31 | 0.99 | 2.30 | 1000 |

Test No. 1 is a case in which a glass frit did not contain an alkali metal, and in Test No. 1, it can be confirmed that the number of pores in an electrode layer after sintering was 250, so that a dense electrode layer could not be formed.

Test No. 2 is a case in which a content of alkali metal in the glass frit was less than 0.16 wt % with respect to a total content of the Cu particles, and in Test No. 2, it can be confirmed that the number of pores in an electrode layer after sintering was 188, so that a dense electrode layer could not be formed.

Test Nos. 3 to 6 are cases in which a content of alkali metal contained in the glass frit is 0.16 wt % or more and 0.35 wt % or less with respect to a total content of the Cu particles, and in Test Nos. 3 to 6, it can be confirmed that the number of pores in an electrode layer after sintering was less than 50, so that density was excellent.

Test Nos. 7 to 9 are cases in which a content of the alkali metal contained in the glass frit exceeds 0.35 wt % with respect to a total content of the Cu particles, and in Test Nos. 7 to 9, it can be confirmed that the number of pores in an electrode layer exceeded 50 after sintering, so that density was not excellent.

Figure 7:
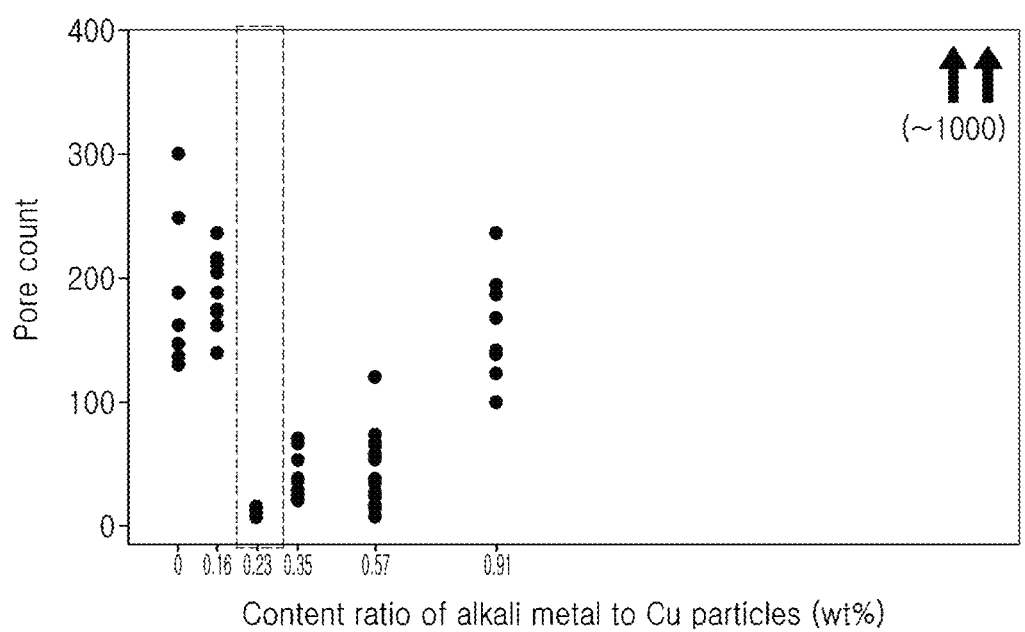
FIG. 7 is a graph illustrating the number of pores in the electrode layer after sintering according to a content of an alkali metal included in the glass frit compared to Cu particles included in the conductive paste.

FIG. 7 is a graph illustrating the number of pores in an electrode layer after sintering according to a content of alkali metal included in a glass frit with respect to a total content of the Cu particles contained in the conductive paste.

Referring to FIG. 7, as illustrated in Table 1, it can be confirmed that the number of pores in an electrode layer after sintering may be controlled according to a content of the alkali metal contained in a glass frit, with respect to the Cu particles contained in a conductive paste.

Accordingly, a conductive paste according to an embodiment of the present disclosure may reduce the number of pores formed in the electrode layer after sintering by adjusting the content of the alkali metal included in the glass frit to 0.16 wt % or more and 0.35 wt % or less with respect to the total content of the Cu particles, to improve density of the electrode layer.

More preferably, the number of pores formed in the electrode layer after sintering may be controlled to less than 25 by adjusting the content of the alkali metal to 0.23 wt % or more and 0.30 wt % or less with respect to the total content of the Cu particles, and thereby, the density of the electrode layer may be further improved.

Meanwhile, in Table 2 below, after forming a plating layer on the samples corresponding to Test Nos. 1 to 9 in Table 1, to manufacture a multilayer electronic component, a content of alkali metal with respect to a total amount of Cu contained in the electrode layer in a final product was measured and shown.

In the final product, a method of measuring the content of the alkali metal with respect to Cu included in the electrode layers 131 and 141 is not particularly limited. For example, a multilayer electronic component 100 may be inserted into 7 ml of hydrochloric acid, treated at 180° C. for 1 hour, filtered, and then a content (ppm) of Cu and alkali metal may be measured through inductively coupled plasma mass spectrometry (ICP-MS), and then it may be converted into wt % of alkali metal with respect to the total content of Cu.

TABLE 2

| Test No. | Cu (g) | Li (g) | K (g) | Alkali metal (g) | The number of pores |
|---|---|---|---|---|---|
| 1 | 100 | 0 | 0 | 0 | 250 |
| 2 | 100 | 0.033 | 0.017 | 0.050 | 188 |
| 3 | 100 | 0.046 | 0.023 | 0.069 | 47 |
| 4 | 100 | 0.066 | 0.033 | 0.098 | 5 |
| 5 | 100 | 0.086 | 0.043 | 0.129 | 23 |
| 6 | 100 | 0.099 | 0.050 | 0.149 | 38 |
| 7 | 100 | 0.165 | 0.083 | 0.248 | 53 |
| 8 | 100 | 0.264 | 0.132 | 0.396 | 162 |
| 9 | 100 | 0.660 | 0.330 | 0.990 | 1000 |

Test No. 1 is a case in which glass does not contain an alkali metal, and in Test No. 1, it can be confirmed that the number of pores in an electrode layer after sintering is 250, and density of the electrode layer is not excellent, so that moisture-resistance reliability of the multilayer electronic component is not excellent.

Test No. 2 is a case in which a content of an alkali metal contained in glass is less than 0.069% with respect to a total content of Cu contained in an electrode layer, and in Test No. 2, it can be confirmed that the number of pores in an electrode layer after sintering is 188, and a dense electrode layer may not be formed, so that moisture-resistance reliability of the multilayer electronic component is not excellent.

Test Nos. 3 to 6 are cases in which a content of alkali metal contained in glass is 0.069 wt % or more and 0.149 wt % or less with respect to a total content of Cu contained in an electrode layer, and in Test Nos. 3 to 6, it can be confirmed that the number of pores in an electrode layer after sintering is less than 50, and density of the electrode layer excellent, so that moisture-resistance reliability of the multilayer electronic component is excellent.

Test Nos. 7 to 9 are cases in which a content of alkali metal contained in the glass exceeds 0.149 wt %, with respect to a total content of Cu contained in an electrode layer, and in Test Nos. 7 to 9, it can be confirmed that the number of pores in the electrode layer after sintering exceeds 50 and density of the electrode layer is not excellent, so that moisture-resistance reliability of the multilayer electronic component is not excellent.

According to an embodiment of the present disclosure, the first and second electrode layers may include metal and glass, the metal may include Cu, the glass may include an oxide containing an alkali metal, and a content of the alkali metal may be controlled to 0.069 wt % or more and 0.149 wt % or less of a total content of Cu, so that the number of pores formed in the electrode layer after sintering may be controlled to less than 25, and the moisture-resistance reliability of the multilayer electronic component may be improved.

As set forth above, as one of the various effects of the present disclosure, glass included in a sintered electrode includes an oxide containing alkali metal, and a content thereof is adjusted to improve density of the sintered electrode without increasing a total content of the glass.

As one of the various effects of the present disclosure, a sealing portion including an oxide containing alkali metal is formed on an interface between an end of a band portion of the sintered electrode and the body to improve acid resistance and moisture-resistance reliability of the multilayer electronic component.

As one of the various effects of the present disclosure, the density of the sintered electrode even in the case of an ultra-small multilayer electronic component is improved to secure excellent acid resistance and moisture-resistance reliability.

However, various and beneficial advantages and effects of the present disclosure are not limited to the above, and will be more easily understood in the course of describing specific embodiments of the present disclosure.

In addition, the expression "an embodiment" used in the present disclosure does not mean the same embodiment as each other, and is provided to emphasize and explain different unique features. However, an embodiment presented above is not excluded from being implemented in combination with the features of another embodiment. For example, even if a matter described in one specific embodiment is not described in another embodiment, it may be understood as a description related to another embodiment unless a description contradicts or contradicts the matter in another embodiment.

The terms used in the present disclosure are used to describe only one embodiment, and are not intended to limit the present disclosure. In this case, the singular expression includes the plural expression unless the context clearly indicates otherwise.

While example embodiments have been shown and described above, it will be apparent to those skilled in the art that modifications and variations could be made without departing from the scope of the present invention as defined by the appended claims.

What is claimed is:

1. A conductive paste, comprising:
a conductive powder containing Cu particles; and
a glass frit including an oxide containing an alkali metal,
wherein a total content of the alkali metal is 0.16 wt % or more and 0.35 wt % or less with respect to a total amount of the Cu particles,
wherein the glass frit further comprises Si, and
a content of Si is 0.55 wt % or more and 0.60 wt % or less with respect to a total amount of the Cu particles.

2. The conductive paste of claim 1, wherein the glass frit further comprises an oxide containing at least one of Ba, Zn, or B.

3. The conductive paste of claim 1, wherein the alkali metal comprises Li or K.

4. A multilayer electronic component, comprising:
a body including a plurality of dielectric layers and first and second internal electrodes alternately disposed with the dielectric layers in a first direction;
a first electrode layer disposed on an external surface of the body and connected to the first internal electrode; and
a second electrode layer disposed on an external surface of the body and connected to the second internal electrode,
wherein the first and second electrode layers include a metal and glass,
the metal includes Cu,
the glass includes an oxide containing an alkali metal, and
a total content of the alkali metal is 0.069 wt % or more and 0.149 wt % or less with respect to a total content of Cu in the first and second electrode layers.

5. The multilayer electronic component of claim 4, wherein the alkali metal comprises at least one of Li or K.

6. The multilayer electronic component of claim 4, wherein the glass further comprises an oxide containing at least one of Ba, Zn, or B.

7. The multilayer electronic component of claim 4, further comprising:
a first plating layer disposed on the first electrode layer; and
a second plating layer disposed on the second electrode layer.

8. The multilayer electronic component of claim 7, wherein the first and second plating layers include at least one of Cu, Ni, Sn, Ag, Au, Pd, or alloys thereof.

9. The multilayer electronic component of claim 7, wherein each of the first and second plating layers includes a Ni plating layer or a Sn plating layer.

10. The multilayer electronic component of claim 4, wherein an average thickness of the first and second electrode layers is 5 μm or more and 20 μm or less.

11. The multilayer electronic component of claim 4, wherein the body comprises a capacitance formation portion including the first and second internal electrodes alternately disposed with the dielectric layer to form capacitance, and a cover portion disposed on upper and lower surfaces of the capacitance formation portion in the first direction, and
an average thickness of the cover portion is 15 μm or less.

12. The multilayer electronic component of claim 4, wherein an average thickness of the dielectric layer is 0.35 μm or less.

13. The conductive paste of claim 12, wherein the conductive powder further comprises at least one selected from the group consisting of nickel (Ni), silver (Ag), or silver-palladium (Ag—Pd).

14. The multilayer electronic component of claim 4, wherein an average thickness of the first and second internal electrodes is 0.35 μm or less.

15. The multilayer electronic component of claim 4, wherein the body comprises first and second surfaces opposing each other in the first direction, third and fourth surfaces connected to the first and second surfaces and opposing each other in a second direction, and fifth and sixth surfaces connected to the first to fourth surfaces and opposing each other in a third direction, and
a maximum size of the multilayer electronic component in the second direction is 1.1 mm or less, and a maximum size of the multilayer electronic component in the third direction is 0.55 mm or less.

16. The multilayer electronic component of claim 4, wherein the body comprises first and second surfaces opposing each other in the first direction, third and fourth surfaces connected to the first and second surfaces and opposing each other in a second direction, and fifth and sixth surfaces connected to the first to fourth surfaces and opposing each other in a third direction,
the first electrode layer comprises a first connection portion disposed on the third surface and connected to the first internal electrode, and a first band portion extending from the first connection portion to a portion of the first, second, fifth, and sixth surfaces,
the second electrode layer comprises a second connection portion disposed on the fourth surface and connected to the second internal electrode, and a second band portion extending from the second connection portion to a portion of the first, second, fifth, and sixth surfaces,
a first sealing portion disposed to extend from an end of the first band portion to a portion on an outer surface of the body; and
a second sealing portion disposed to extend from an end of the second band portion to a portion on an outer surface of the body.

17. The multilayer electronic component of claim 16, further comprising:
a first plating layer disposed on the first electrode layer; and
a second plating layer disposed on the second electrode layer,
wherein the first plating layer is disposed to cover at least a portion of the first sealing portion, and the second plating layer is disposed to cover at least a portion of the second sealing portion.

18. The multilayer electronic component of claim 16, wherein the first and second sealing portions comprise the same material as the glass.

19. A conductive paste, comprising:
a conductive powder containing Cu particles; and
a glass frit including an oxide containing an alkali metal,
wherein a total content of the alkali metal is 0.23 wt % or more and 0.30 wt % or less with respect to a total amount of the Cu particles,
the glass frit further comprises Si, and
a content of Si is 0.55 wt % or more and 0.60 wt % or less with respect to a total amount of the Cu particles.

* * * * *